United States Patent [19]
Eylon

[11] Patent Number: 5,429,877
[45] Date of Patent: Jul. 4, 1995

[54] INTERNALLY REINFORCED HOLLOW TITANIUM ALLOY COMPONENTS

[75] Inventor: Daniel Eylon, Dayton, Ohio

[73] Assignee: The United States of America as represented by the Secretary of the Air Force, Washington, D.C.

[21] Appl. No.: 138,480

[22] Filed: Oct. 20, 1993

[51] Int. Cl.6 ............................................ B21C 37/00
[52] U.S. Cl. ...................................... 428/586; 29/458; 29/463; 29/889.71; 29/889.72; 228/262.71; 228/262.72; 416/232; 416/241 R; 428/608; 428/611; 428/614; 428/660
[58] Field of Search ................ 428/34.4, 34.5, 608, 428/611, 614, 660, 586; 228/143, 145, 176, 190, 265, 262.71, 262.72; 148/669, 670; 29/889.71, 458, 463, 889.72; 416/232, 241 R

[56] References Cited

U.S. PATENT DOCUMENTS

| | | | |
|---|---|---|---|
| 3,701,190 | 10/1972 | Stone, Jr. | 29/156.8 |
| 4,301,584 | 11/1981 | Dillner et al. | 29/156.8 |
| 4,383,426 | 5/1983 | Legge | 72/63 |
| 4,594,761 | 6/1986 | Murphy et al. | 29/156.8 |
| 4,856,162 | 8/1989 | Graff et al. | 29/156.8 |
| 5,213,252 | 5/1993 | Eylon | 228/176 |

Primary Examiner—James J. Bell
Attorney, Agent, or Firm—Bobby D. Scearce; Thomas L. Kundert

[57] ABSTRACT

An internally reinforced hollow structure is described which comprises a layer of titanium metal matrix composite applied to the internal surfaces of structural segments comprising the hollow structure, the segments then being joined to form the desired hollow structure.

11 Claims, 1 Drawing Sheet

INTERNALLY REINFORCED HOLLOW TITANIUM ALLOY COMPONENTS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to hollow structures such as rotor blades, fan blades compressor blades and vanes and the like used in gas turbine engines, and more particularly to internally stiffened hollow structures utilizing titanium and titanium composites.

Modern high-thrust/high-bypass gas turbine engines require large fan blades and large compressor blades and vanes, and may operate at high rotation speeds, high compression ratios and high turbine entry temperatures. Consequently, rotating engine components must be strong, stiff, light in weight and high temperature resistant. Conventional structures for fan blades and compressor blades and vanes include hollow titanium structures having internal stiffening ribs or honeycomb structures disposed in the hollow space within the structures. The stiffening ribs may be machined into the inner surfaces of two bonded segments that comprise such a structure, or the honeycomb may be inserted into the hollow space prior to bonding. The stiffening ribs are expensive and difficult to manufacture. The resultant structure is usually light in weight but characterized by inherent relatively low stiffness.

In accordance with the teachings of the invention, a hollow component such as a turbine engine blade or vane may be stiffened internally by bonding a layer of titanium matrix composite onto the inner (usually curved) surfaces of the structural segments comprising the component. The layer may comprise one or more mats of ceramic fibers and alloy matrix which form a stiffening layer of titanium matrix composite on the inner surfaces of the structure. The composite may be applied using methods such as vacuum hot pressing or hot isostatic pressing of alloy foils and fibers, or by plasma spray deposition of molten alloy powder over fiber mats. Such reinforced segments are then joined by any suitable method such as brazing, diffusion bonding or electron beam welding to form the desired hollow structure. Because of the high specific stiffness of the composite layers, and the location of the layers at the outermost extremities of the cavity defined within the structure, the resultant structure has high stiffness and is light in weight.

The invention has wide application to high-bypass gas turbine engines such as those presently used on commercial and military aircraft, and to future engine generations having high bypass ratios, compression ratios and speeds of rotation.

It is therefore a principal object of the invention to provide an improved stiffened structure for a rotor blade, fan blade, or compressor blade or vane for a gas turbine engine.

It is a further object of the invention to provide a stiffened hollow blade or vane structure comprising titanium for use in a rotor, compressor or fan within a gas turbine engine.

These and other objects of the invention will become apparent as a detailed description of representative embodiments proceeds.

SUMMARY OF THE INVENTION

In accordance with the foregoing principles and objects of the invention, an internally reinforced hollow structure is described which comprises a layer of titanium metal matrix composite applied to the internal surfaces of structural segments comprising the hollow structure, the segments then being joined to form the desired hollow structure.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
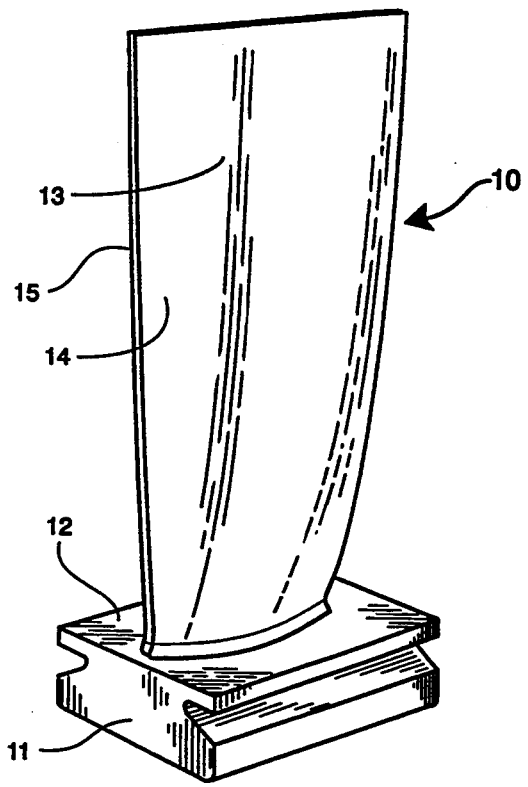
FIG. 1 is a perspective view of a typical hollow component in the form of a turbine rotor blade fabricated according to the teachings of the invention.
Figure 2:
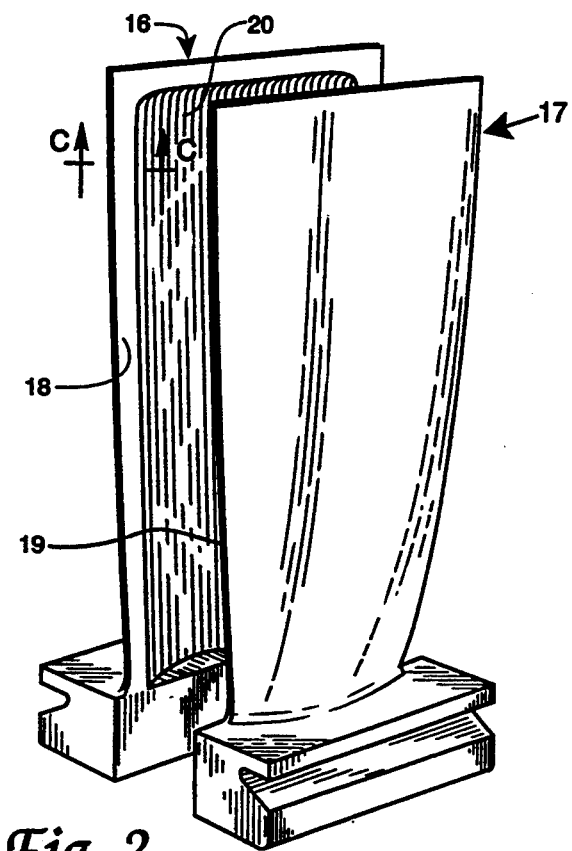
FIG. 2 is an exploded view of the FIG. 1 blade showing the component portions thereof.

Referring now to the drawings, FIG. 1 is a perspective view of a typical assembled hollow component in the form of a turbine rotor blade 10 fabricated according to the invention. FIG. 2 is an exploded view of rotor blade 10 showing its component segments. Rotor blade 10 may comprise a cast or machined assembly including dovetail 11 having tangs, fir tree or other keyed configuration for mounting to a matching slot on the rotor (not shown) of the turbine. Platform 12 supports hollow cambered airfoil blade portion 13 typically comprising a thin wall shell having cambered sides 14,15 defining a hollow interior. Blade 10 may include at least two segments 16,17 (FIG. 2) comprising titanium or any of the titanium alloys hereinafter named. Segments 16,17 may be diffusion bonded, brazed, electron beam welded or otherwise assembled along an interface defined by respective contacting surfaces 18,19.

Figure 3:
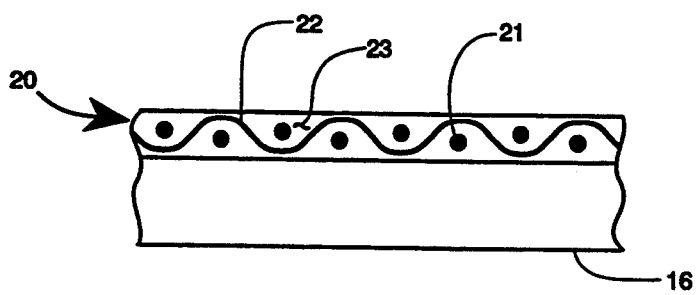
FIG. 3 is a view in section of a representative stiffening layered structure applied to the component of FIGS. 1,2 according to the invention.

In accordance with a governing principle of the invention, a hollow structure, exemplified by blade 10, may be substantially stiffened by application of composite layer 20 suitably structured and bonded to the inner surface of at least one of the segments 16,17 constituting blade 10. FIG. 3 is a view in section along line C—C of FIG. 2 showing representative layer 20 applied to segments 16,17 according to the invention. Layer 20 may typically comprise a metal matrix composite of fibers 21 and metallic crossweave wires 22 in a matrix 23. In preferred embodiments of the invention, fibers 21 comprise ceramics of silicon carbide (SiC), carbon coated SiC (SCS-6), silicon coated SiC, SiC coated boron, boron carbide coated boron, alumina ($Al_2O_3$) or metallic glass fibers; crossweave wires 22 comprise a material substantially similar to the matrix 23 material; and matrix 23 is an alpha-beta or near-alpha titanium alloy including, but not limited to, Ti-3Al-2.5V, Ti-5Al-2.5Sn, Ti-5Al-2Sn-2Zr-4Mo-4Cr, Ti-6Al-4V, Ti-6Al-6V-2Sn, Ti-6Al-2Sn-4Zr-2Mo-2Cr, Ti-6Al-2Sn-4Zr-6Mo, Ti-6Al-2Sn-4Zr-2Mo-0.1Si, Ti-6Al-2Nb-1Ta-0.8Mo, Ti-7Al-4Mo, Ti-8Mn, Ti-4.5Al-5Mo-1.5Cr, Ti-8Al-1Mo-1V, and Ti-2.25Al-11Sn-5Zr-1Mo (A selected alloy may further contain up to about 6 weight percent of a dispersoid such as boron, thorium or a rare earth). Other constituent materials may be selected within the scope of the appended claims by the skilled artisan practicing the invention. Layer 20 may be applied by any suitable method, such as vacuum hot pressing, hot isostatic pressing of alloy foils, or plasma spray deposition of molten alloy powder over fiber mats. Fibers 21 may be short with substantially random orientation, or long and substantially continuous and aligned along the long axis of the component to be stiffened to provide maximum stiffness in the desired direction. The fibers may be unidirectionally applied to provide stiffness in one direction or cross plied to provide stiffness in more than one direction.

The invention may have wide application not only to the fabrication of internally stiffened hollow titanium alloy components used in gas turbine aircraft engine structures, but also to the fabrication of hollow steel based blades used in power generation units, hollow aluminum based components used in land based gas turbine engines, and hollow nickel-cobalt alloy based structures used in most turbine sections of gas turbine engines.

The invention therefore provides an improved internally stiffened hollow structure and method of fabrication. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An internally reinforced hollow titanium alloy structure, comprising:
    (a) at least two titanium alloy structural segments joinable to form a hollow structure; and
    (b) a layer of titanium matrix composite on at least one of said segments at an inner surface of said hollow structure.

2. The structure of claim 1 wherein said layer of titanium matrix composite comprises ceramic fibers selected from the group consisting of silicon carbide, carbon coated silicon carbide, silicon carbide coated boron, boron carbide coated boron, silicon coated silicon carbide, alumina, and metallic glasses.

3. The structure of claim 1 wherein said layer of titanium matrix composite includes a matrix material comprising an alpha-beta or near-alpha titanium alloy.

4. The structure of claim 3 wherein said alloy is selected from the group consisting of Ti-3Al-2.5V, Ti-5Al-2.5Sn, Ti-5Al-2Sn-2Zr-4Mo-4Cr, Ti-6Al-4V, Ti-6Al-6V-2Sn, Ti-6Al-2Sn-4Zr-2Mo-2Cr, Ti-6Al-2Sn-4Zr-6Mo, Ti-6Al-2Sn-4Zr-2Mo-0.1Si, Ti-6Al-2Nb-1Ta-0.8Mo, Ti-7Al-4Mo, Ti-8Mn, Ti-4.5Al-5MO-1.5Cr, Ti-8Al-1Mo-1V, and Ti-2.25Al-11Sn-5Zr-1Mo.

5. The structure of claim 2 wherein said fibers are substantially continuous and aligned along the long axis of said hollow structure.

6. A method for fabricating an internally reinforced hollow titanium alloy structure, comprising the steps of:
    (a) providing at least two titanium alloy structural segments joinable to form a hollow structure;
    (b) applying a layer of titanium matrix composite on at least one of said segments at an inner surface of said hollow structure; and
    (c) joining said segments to form said hollow structure.

7. The method of claim 6 wherein said segments are joined by brazing, diffusion bonding or electron beam welding.

8. The method of claim 6 wherein said layer of titanium matrix composite comprises ceramic fibers selected from the group consisting of silicon carbide, carbon coated silicon carbide, silicon carbide coated boron, boron carbide coated boron, silicon coated silicon carbide, alumina, and metallic glasses.

9. The method of claim 6 wherein said layer of titanium matrix composite includes a matrix material comprising an alpha-beta or near-alpha titanium alloy.

10. The method of claim 9 wherein said alloy is selected from the group consisting of Ti-3Al-2.5V, Ti-5Al-2.5Sn, Ti-5Al-2Sn-2Zr-4Mo-4Cr, Ti-6Al-4V, Ti-6Al-6V-2Sn, Ti-6Al-2Sn-4Zr-2Mo-2Cr. Ti-6Al-2Sn-4Zr-6Mo, Ti-6Al-2Sn-4Zr-2Mo-0.1Si, Ti-6Al-2Nb-1Ta-0.8Mo, Ti-7Al-4Mo. Ti-8Mn, Ti-4.5Al-5MO-1.5Cr, Ti-8Al-1Mo-1V, and Ti-2.25Al-11Sn-5Zr-1Mo.

11. The method of claim 9 wherein said composite is applied by vacuum hot pressing, hot isostatic pressing, or plasma spray deposition.

* * * * *